(12) United States Patent
Keith

(10) Patent No.: X9471
(45) Date of Patent: Mar. 4, 1836

(54) GIN, COTTON, GRATES

(76) Inventor: Edwin Keith

Edwin Keith Bridgewater Mass.

Letters Patent

The Schedule referred to in these Letters Patent and making part of the same
Containing a description in the words of the said Edwin Keith of his Im
provement in the manufacture of grates for Cotton Gins To all to whom these presents Shall come: Be it known that I Edwin Keith
of Bridgewater in the County of Plymouth and State of Massachusetts have
invented a new and useful Improvement in the Manufacture of Cotton Gin
Grates and that the following is a full and exact description of the mode of man
ufacturing them as improved by me. I make the Cotton Gin Grates in Sheets
of two or more connected at the ends of cast iron or other fusible metal suit
able for the purpose and at that part of the space where the saw teeth pass through
I introduce into the mould before the melted metal is poured in, small
Chills of the same thickness with the width of the space between the grates. These chills
may be made of cast iron wrought iron or any material which will have
the effect to chill the metal suddenly where it comes in contact with it so
that when it is cooled it will have acquired the necessary hardness. I have
used a pattern of copper for the grates & have had them cast of iron. I make
two in one sheet and after I have cut out the spaces between the the grates
in the pattern I bend it to its proper shape and mould it in common moulding
sand and after introducing the chills as before described the mould is ready
to pour. The same object might be effected although at a greater expense by ma
king a metal mould and thus chilling the grates in every part but I have made
use of chills only to harden that part of the grate most exposed to friction which
in the common wrought iron grate is often so much worn as to be useless.
My claim is to the making of Grates for Cotton Gins of cast iron or other
fusible metal suitable for the purpose in sheets of two or more connected at the
ends and of chilling them either in whole or in part as described above. [illegible]

Witnesses [illegible]

Daniel Mitchell
Jos. A. Hyde

Edwin Keith

[illegible]

[illegible] Drawing required